(12) United States Patent
Gamblin et al.

(10) Patent No.: US 11,129,504 B2
(45) Date of Patent: Sep. 28, 2021

(54) UNIVERSAL COUPLER AND SPORTS TOWEL SYSTEM WITH UNIVERSAL COUPLER

(71) Applicant: Monument Golf LLC, Scottsdale, AZ (US)

(72) Inventors: Chad Gamblin, Mesa, AZ (US); Jeff Eggen, Mesa, AZ (US)

(73) Assignee: MONUMENT GOLF LLC, Scottsdale, AZ (US)

( * ) Notice: Subject to any disclaimer, the term of this patent is extended or adjusted under 35 U.S.C. 154(b) by 17 days.

(21) Appl. No.: 16/658,271

(22) Filed: Oct. 21, 2019

(65) Prior Publication Data
US 2020/0138247 A1    May 7, 2020

Related U.S. Application Data

(60) Provisional application No. 62/756,404, filed on Nov. 6, 2018.

(51) Int. Cl.
*A47K 10/14* (2006.01)
*F16M 13/02* (2006.01)
*F16M 13/00* (2006.01)

(52) U.S. Cl.
CPC .......... *A47K 10/14* (2013.01); *F16M 13/022* (2013.01); *F16M 13/005* (2013.01)

(58) Field of Classification Search
CPC ...... A47K 10/14; A47K 10/12; F16M 13/022; F16M 13/02; F16M 13/005; B65D 73/0014
USPC ... 248/683, 206.5, 205.1, 205.2, 205.3, 345; 248/323, 324, 506, 510; 211/88.04, 6, 211/16; 224/932, 183; 206/495, 806, 206/818, 350; 473/406, 408; D3/224; 24/303
See application file for complete search history.

(56) References Cited

U.S. PATENT DOCUMENTS

| | | | | |
|---|---|---|---|---|
| 2,121,561 A | * | 6/1938 | English | A41B 15/00 150/106 |
| 2,754,532 A | * | 7/1956 | Kanehl | A41B 15/00 15/209.1 |
| 3,159,281 A | * | 12/1964 | Hutter | A47K 10/12 211/45 |
| 3,529,328 A | * | 9/1970 | Davison | D06F 55/00 24/303 |

(Continued)

*Primary Examiner* — Eret C McNichols
*Assistant Examiner* — Michael McDuffie
(74) *Attorney, Agent, or Firm* — Schmeiser, Olsen & Watts LLP

(57) ABSTRACT

A sports towel system has been described that includes a towel, a universal coupling device, and a universal coupler. The towel is coupled to the universal coupling device. The universal coupling device is removably coupled to the universal coupler. The universal coupler includes a pouch that holds a magnet. The magnet is used to removably couple the universal coupler and the towel to a metal surface. The sports towel system can be used by golfers and can be magnetically coupled to a golf cart or a golf club, for example. The universal coupler has a first and a second flap coupled to the pouch. The first flap has a first flap coupling element and the second flap has a second flap coupling element. The flap coupling elements are used to removably couple the universal coupler to the universal coupling device to attach the towel to the universal coupler.

17 Claims, 16 Drawing Sheets

(56) References Cited

U.S. PATENT DOCUMENTS

| | | | | |
|---|---|---|---|---|
| 3,755,858 A * | 9/1973 | McPhaul | | A47K 10/12 |
| | | | | 248/690 |
| 4,403,366 A * | 9/1983 | Lucke | | A47K 10/02 |
| | | | | 15/209.1 |
| 4,771,502 A * | 9/1988 | Trimble | | A45F 5/00 |
| | | | | 15/209.1 |
| 4,885,195 A * | 12/1989 | Change, III | | A47K 10/12 |
| | | | | 428/36.1 |
| 5,147,703 A * | 9/1992 | Provost | | A47K 10/02 |
| | | | | 15/209.1 |
| 5,465,458 A * | 11/1995 | Schlager | | A47G 9/062 |
| | | | | 16/404 |
| 6,836,899 B1 * | 1/2005 | Glasmire | | A45F 5/04 |
| | | | | 2/323 |
| 7,322,068 B1 * | 1/2008 | Kim | | A47K 10/02 |
| | | | | 15/209.1 |
| 7,955,683 B1 * | 6/2011 | Ferrell | | A63B 55/408 |
| | | | | 428/99 |
| 9,981,197 B2 * | 5/2018 | Akavia | | A63H 33/3055 |
| 10,322,325 B2 * | 6/2019 | Farina | | A63B 47/04 |
| 10,342,393 B1 * | 7/2019 | Kirkpatrick | | A47K 10/04 |
| 2005/0150782 A1 * | 7/2005 | Leonard | | A45C 11/00 |
| | | | | 206/37 |
| 2005/0217048 A1 * | 10/2005 | Elie | | A47K 10/02 |
| | | | | 15/209.1 |
| 2008/0234114 A1 * | 9/2008 | McGuigan | | A63B 69/0028 |
| | | | | 482/74 |
| 2009/0151105 A1 * | 6/2009 | Bohannon | | A63B 57/60 |
| | | | | 15/210.1 |
| 2009/0200440 A1 * | 8/2009 | Franco | | A47L 13/16 |
| | | | | 248/205.5 |
| 2013/0323457 A1 * | 12/2013 | Barringer | | A47K 10/02 |
| | | | | 428/99 |
| 2016/0067675 A1 * | 3/2016 | Schneider | | B01J 20/28009 |
| | | | | 428/34.1 |
| 2016/0114225 A1 * | 4/2016 | Brown | | A63B 47/04 |
| | | | | 15/118 |
| 2017/0020208 A1 * | 1/2017 | Velie | | A47K 10/02 |
| 2019/0090390 A1 * | 3/2019 | Judy | | A45C 3/001 |

* cited by examiner

UNIVERSAL COUPLER AND SPORTS TOWEL SYSTEM WITH UNIVERSAL COUPLER

CROSS REFERENCE TO RELATED APPLICATION

This invention claims priority to U.S. provisional patent application Ser. No. 62/756,404, filed Nov. 6, 2018, and entitled "UNIVERSAL COUPLER AND SPORTS TOWEL SYSTEM WITH UNIVERSAL COUPLER", which is incorporated entirely herein by reference.

BACKGROUND OF THE INVENTION

Technical Field

This invention relates to sports towels and couplers for sports towels, and specifically to a sports towel system that includes a universal coupler having a magnet.

State of the Art

Sports towels are towels used by sports participants. An example of a sports towel is a golf towel that is used by golfers to clean golf balls and wipe their hands during the golf game. Sports towels are easily misplaced or lost if they are not attached to the sports equipment. It is desirable to have a sports towel that is connected to the sports equipment in a way that the sports towel can be easily grabbed, used, and put back repeatably.

Accordingly, what is needed is a universal coupler that is removably attached to a towel, where the universal coupler is easily and removably coupled to a piece of sports equipment.

DETAILED DESCRIPTION OF EMBODIMENTS OF THE INVENTION

This invention relates to sports towels and couplers for sports towels, and specifically to a sports towel system that includes a universal coupler having a magnet. Sports towels are used by athletes competing in sports activities. It is advantageous for the towel to be removably coupled to sporting equipment so that the towel can be easily retrieved, used, and replaced during the game. Disclosed herein is a sports towel system that includes a universal coupler, a towel, and a universal coupling device. The sports towel system includes a towel coupled to a universal coupling device. The universal coupling device is fixedly coupled to the towel. The universal coupler couples to the towel by removably coupling the universal coupler to the universal coupling device. The universal coupler includes a magnet that removably couples the sports towel system, including the towel, to a metal surface. The universal coupler is removably coupled to the universal coupling device so that the towel and universal coupling device can be washed or replaced, for example. The universal coupler of the sports towel system can be easily coupled to, or removed from, a metal surface such as a golf club or a golf cart, for example, so that the sports towel system is readily available to a golfer and is not lost or misplaced during the golf game. The universal coupler can be removably coupled to a metal surface of any type of sports equipment. The universal coupler can also be used to removably couple other pieces of sports equipment or devices to a metal surface.

Figure 1:
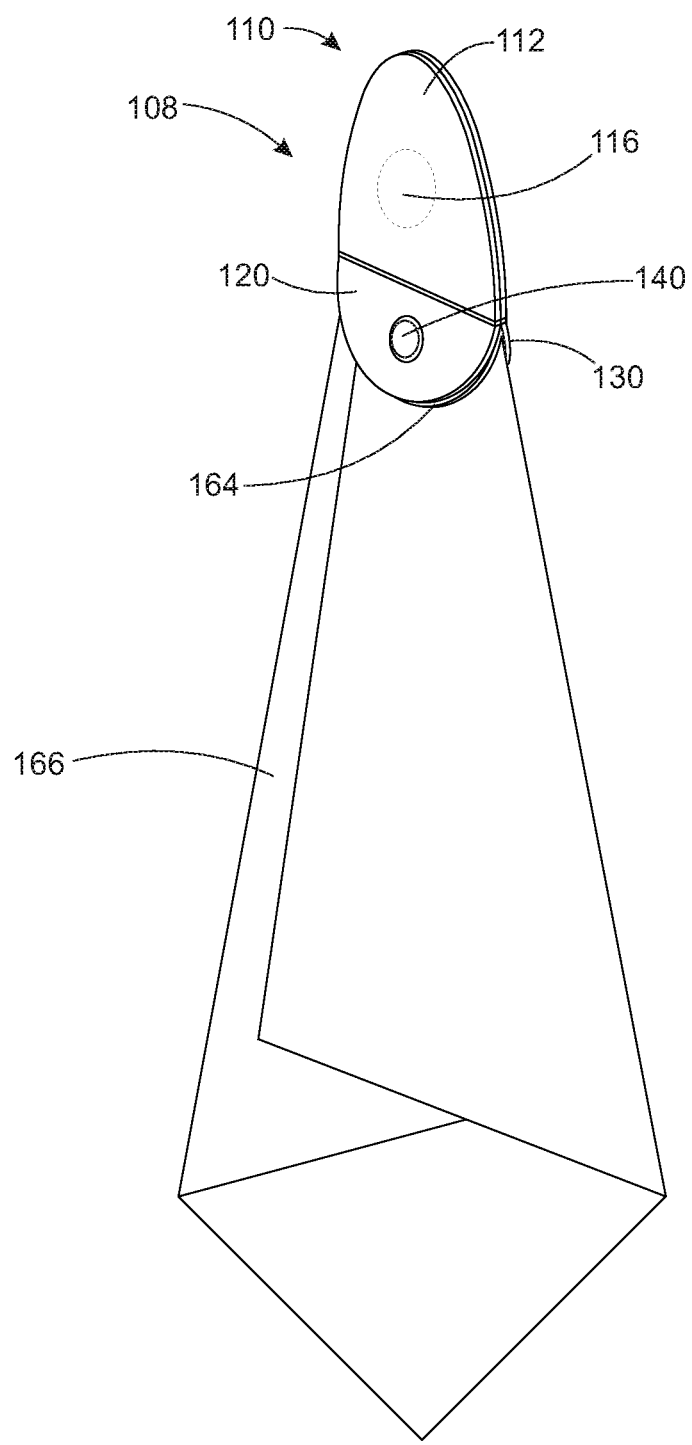
FIG. 1 shows a front perspective view of an embodiment of a sports towel system that includes a universal coupler, a towel, and a universal coupling device.
Figure 2:
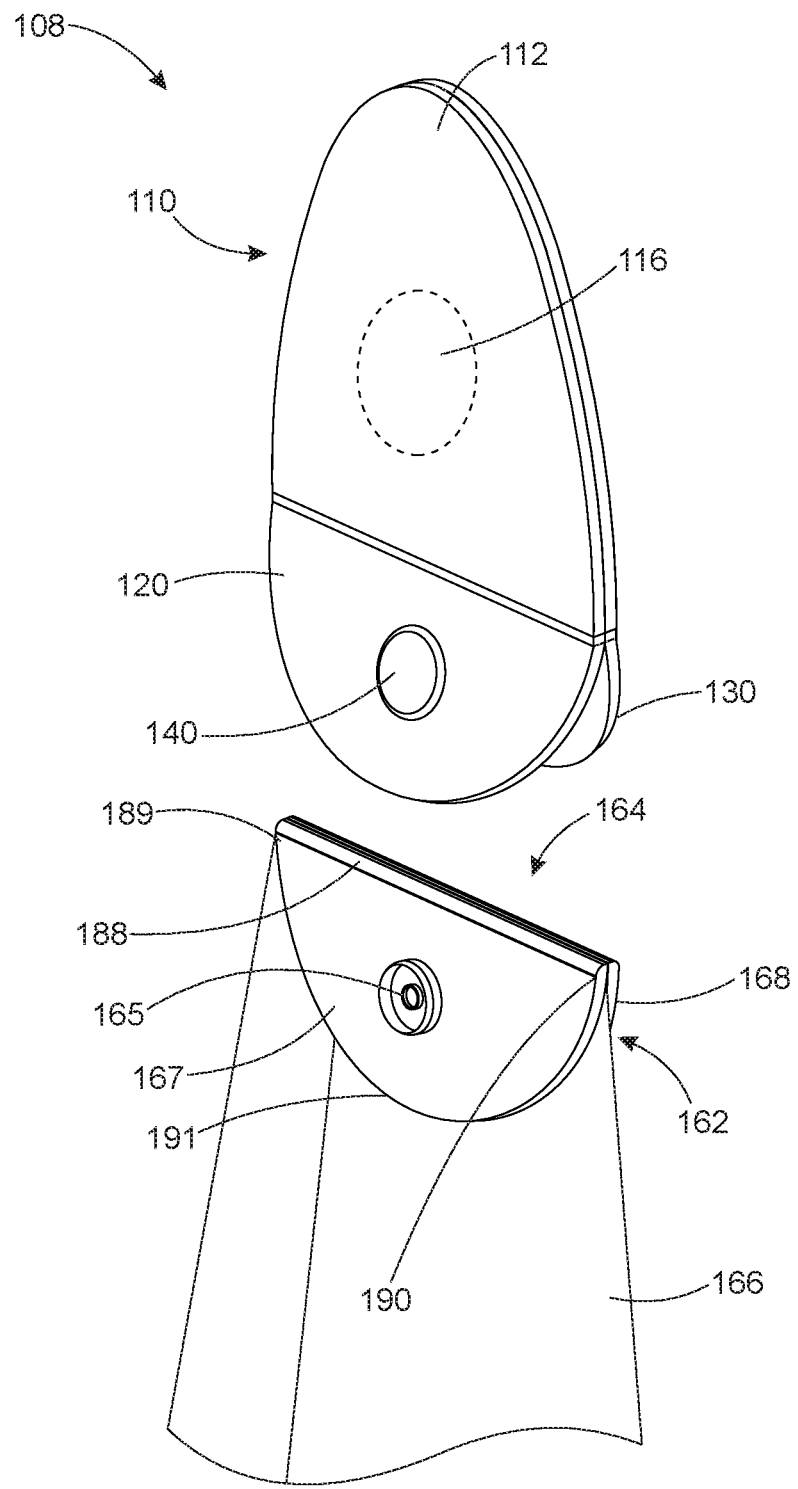
FIG. 2 shows a front perspective view of the sports towel system of FIG. 1 with the universal coupler un-coupled from the universal coupling device.
Figure 3:
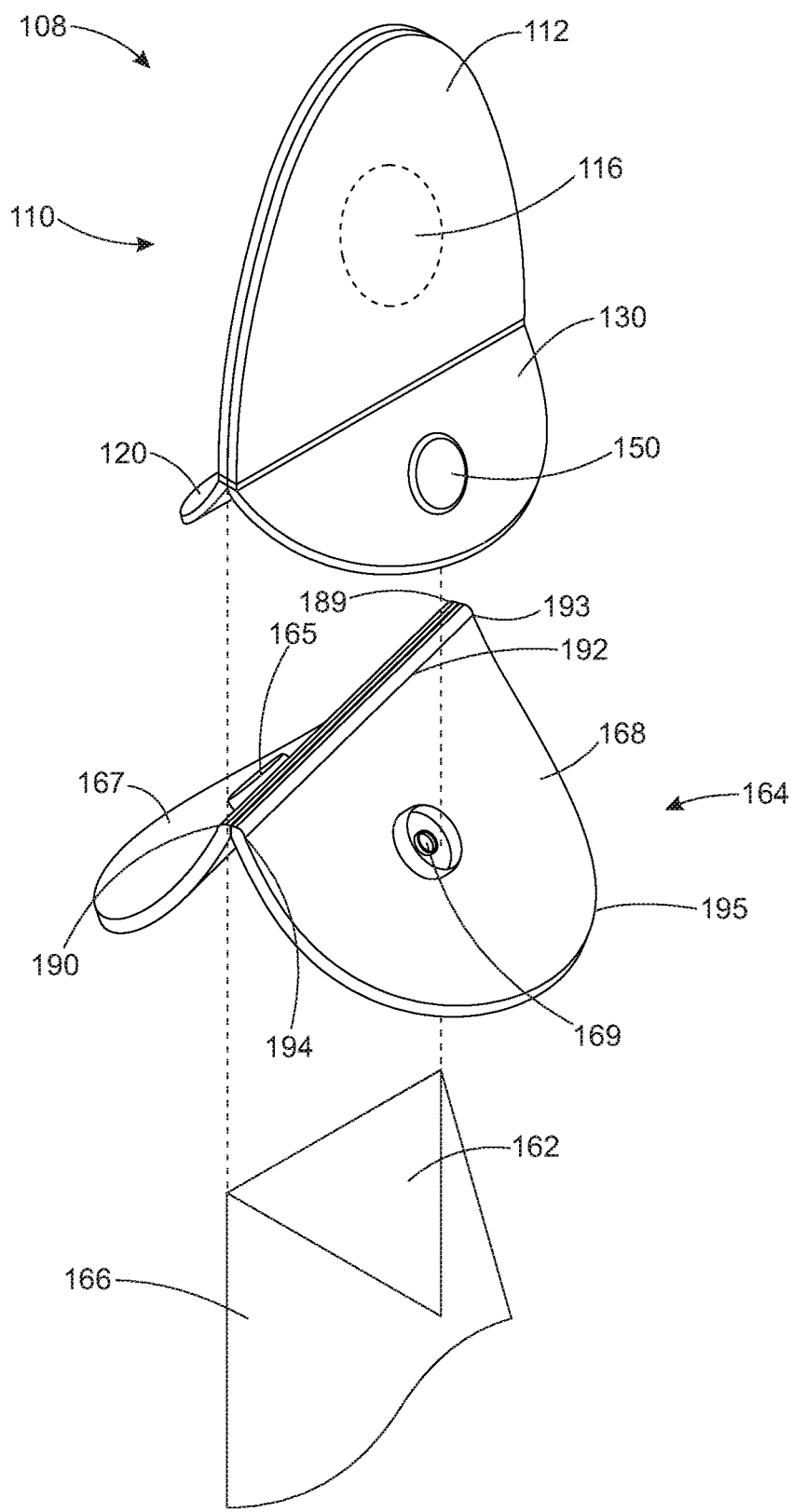
FIG. 3 shows an exploded rear perspective view of the sports towel system of FIG. 1.

FIG. 1 through FIG. 3 shows an embodiment of a sports towel system 108. Sports towel system 108 can be used by golfers or other athletes that use a towel while participating in their sporting event. The sports activities can include, but are not limited to, golf, swimming, diving, bowling, and baseball. Sports towel system 108 includes a towel 166, a universal coupling device 164, and a universal coupler 110. Towel 166 is fixedly coupled to universal coupling device 164 in this embodiment. Universal coupling device 164 is removably coupled to universal coupler 110. Universal coupler 110 includes a magnet 116. Universal coupler 110 couples sports towel system 108 to any metal surface using magnet 116, so sports towel system 108 is particularly useful for athletes that have metal surfaces nearby where they will use a towel. Sports towel system 108 can be easily attached and removed from a golf club, for example, or a golf cart, making sports towel system 108 useful for golfers, for example. In some embodiments, towel 166 is removably coupled to universal coupling device 164.

FIG. 1 shows a front perspective view of sports towel system 108. FIG. 2 shows a front perspective view of sports towel system 108 with universal coupler 110 un-coupled from universal coupling device 164. FIG. 3 shows a rear perspective exploded view of sports towel system 108, with universal coupler 110 uncoupled from universal coupling device 164, and universal coupling device 164 uncoupled from towel 166. Sports towel system 108 is the combination of towel 166, universal coupling device 164, and universal coupler 110.

Sports towel system 108 includes universal coupling device 164. Universal coupling device 164 is coupled to another item that is to be removably coupled to universal coupler 110. In this embodiment, universal coupling device 164 is fixedly coupled to towel 166, but this is not meant to be limiting. It is to be understood that universal coupling device 164 can be fixedly, or removably, coupled to many different items, such as a phone, a wallet, a piece of clothing, or any element, item, device, or thing that it is desired to couple to universal coupler 110 so that universal coupler 110 can couple the item to a metal surface.

In the embodiment shows in FIG. 1 through FIG. 3, universal coupling device 164 is fixedly coupled to towel 166. When towel 166 is washed, for example, the combination of towel 166 and universal coupling device 164 is thrown in the wash. Universal coupling device 164 is sewn to towel 166 in this embodiment, but this is not meant to be limiting. Universal coupling device 164 can be coupled to towel 166 using any coupling means and methods, including glue or staples, for example. In the embodiment shown in FIG. 1 through FIG. 3, universal coupling device 164 is coupled to a towel corner 162, best seen in FIG. 3. Universal coupling device 164 is semicircular shaped in both front and rear views, best seen in FIG. 2 and FIG. 3. Semicircular shaped is also called half-moon shape or half circle shaped. In some embodiments, universal coupling device 164 has a shape other than semicircular.

Universal coupling device 164 includes a semicircular shaped universal coupling device front panel 167 and a semicircular shaped universal coupling device rear panel 168, in this embodiment, see FIG. 2 and FIG. 3. Universal coupling device front panel 167 and universal coupling device rear panel 168 are each formed of a flexible material, in this embodiment. Universal coupling device front panel 167 and universal coupling device rear panel 168 each have the same size and shape, in this embodiment. Universal coupling device front panel 167 is coupled to—in this embodiment sewed to—universal coupling device rear panel 168 with towel corner 162 in between universal coupling device front panel 167 and universal coupling device rear panel 168, which couples universal coupling device 164 to towel 166 (see FIG. 3). In some embodiments, universal coupling device 164 is coupled to parts of towel 166 other than towel corner 162. In some embodiments, universal coupling device front panel 167 and/or universal coupling device rear panel 168 are formed of a rigid material. In the embodiment of sports towel system 108 shown in FIG. 1 through FIG. 3, towel 166 is coupled to universal coupling device 164 in response to universal coupling device front panel 167 being coupled to universal coupling device rear panel 168 with towel 166 in between universal coupling device front panel 167 and universal coupling device rear panel 168.

Universal coupling device front panel 167 (best seen in FIG. 2) includes a universal coupling device front panel straight edge 188 that extends from a front panel first corner 189 to a front panel second corner 190. Universal coupling device front panel 167 also includes a universal coupling device front panel curved edge 191 that is curved in a semicircular arc, in this embodiment, and extends from front panel first corner 189 to front panel second corner 190. In some embodiments, universal coupling device front panel curved edge 191 has a curved shape other than a semicircular arc.

Universal coupling device 165 includes a first device coupling element 165. First device coupling element 165 is coupled to universal coupling device front panel 167. First device coupling element 165 is a snap element in this embodiment, but this is not meant to be limiting. First device coupling element 165 can be any type and form of coupling element. First device coupling element 165 is used to couple universal coupling device 164 to universal coupler 110.

Universal coupling device rear panel 168 (best seen in FIG. 3) includes a universal coupling device rear panel straight edge 192 that extends from a rear panel first corner 193 to a rear panel second corner 194, see FIG. 3. Universal coupling device rear panel 168 also includes a universal coupling device rear panel curved edge 195 that is curved in a semicircular arc, in this embodiment, and extends from rear panel first corner 193 to rear panel second corner 194. In some embodiments, universal coupling device rear panel curved edge 195 has a curved shape other than a semicircular arc.

Universal coupling device 165 includes a second device coupling element 169. Second device coupling element 169 is coupled to universal coupling device rear panel 168. Second device coupling element 169 is a snap element in this embodiment, but this is not meant to be limiting. Second device coupling element 169 can be any type and form of coupling element. Second device coupling element 169 is used to couple universal coupling device 164 to universal coupler 110.

Towel 166 is coupled to universal coupling device 164 by placing towel corner 162 between universal coupling device front panel 167 and universal coupling device rear panel 168 and sewing, or otherwise coupling, universal coupling device front panel straight edge 188 to universal coupling device rear panel straight edge 192, and sewing, or otherwise coupling, universal coupling device front panel curved edge 191 to universal coupling device rear panel curved edge 195, with towel corner 162 in between universal coupling device front panel 167 and universal coupling device rear panel 168, forming a semicircular shaped universal coupling device 164 that is coupled to towel 166 by sewing or other coupling means, see FIG. 1 through FIG. 3.

Universal coupling device 164 and towel 166 are removably coupled to universal coupler 110 to form sports towel system 108. Universal coupler 110 includes magnet 116 and is used to removably couple sports towel system 108 to any metal surface. Universal coupler 110 is used to removably couple towel 166 to a metal surface in this embodiment, but it is to be understood that universal coupler 110 can have many different items coupled to universal coupler 110, and can be used to removably couple the different items to a metal surface.

Figure 4:
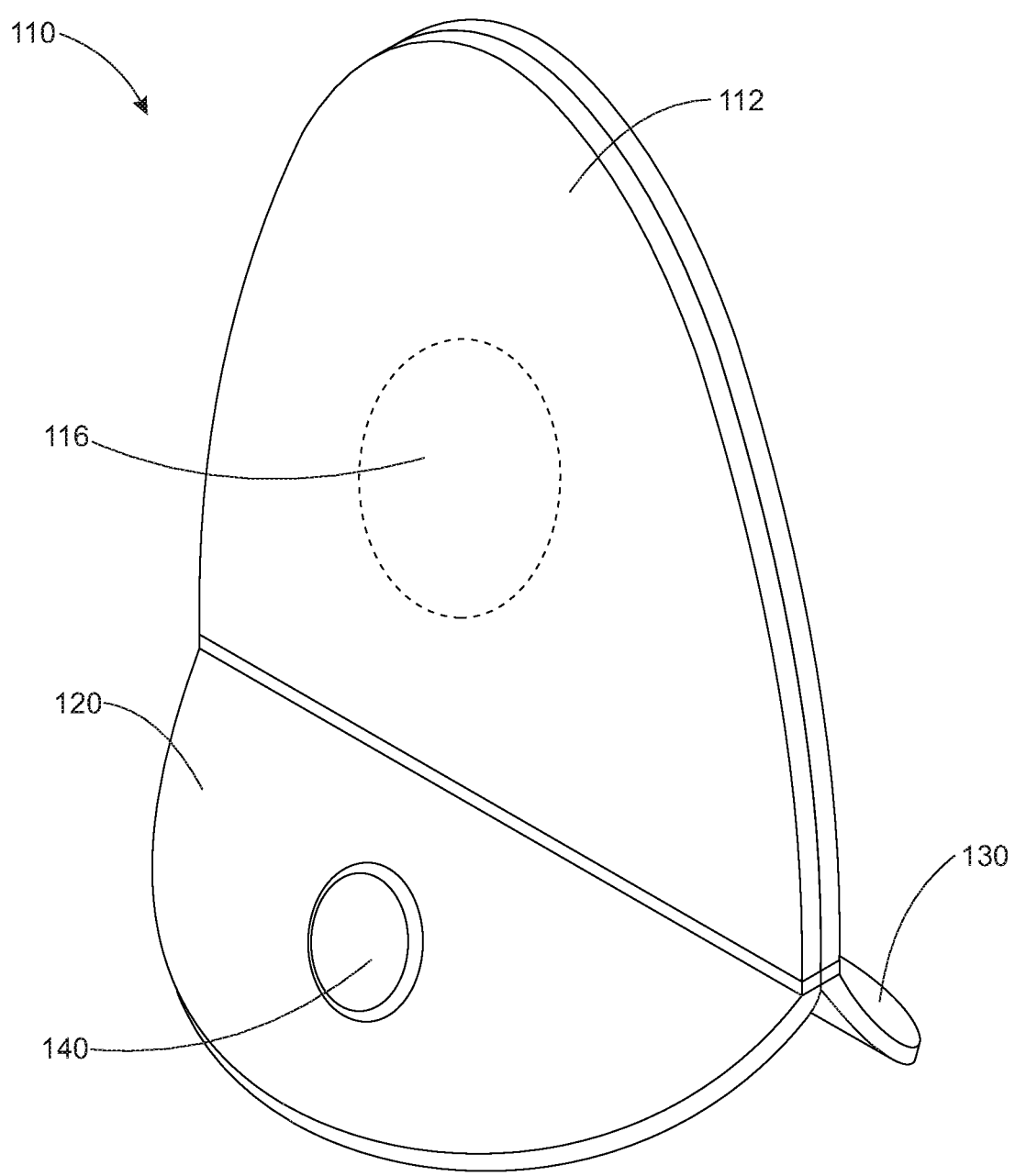
FIG. 4 shows a front perspective view of an embodiment of a universal coupler.
Figure 5:
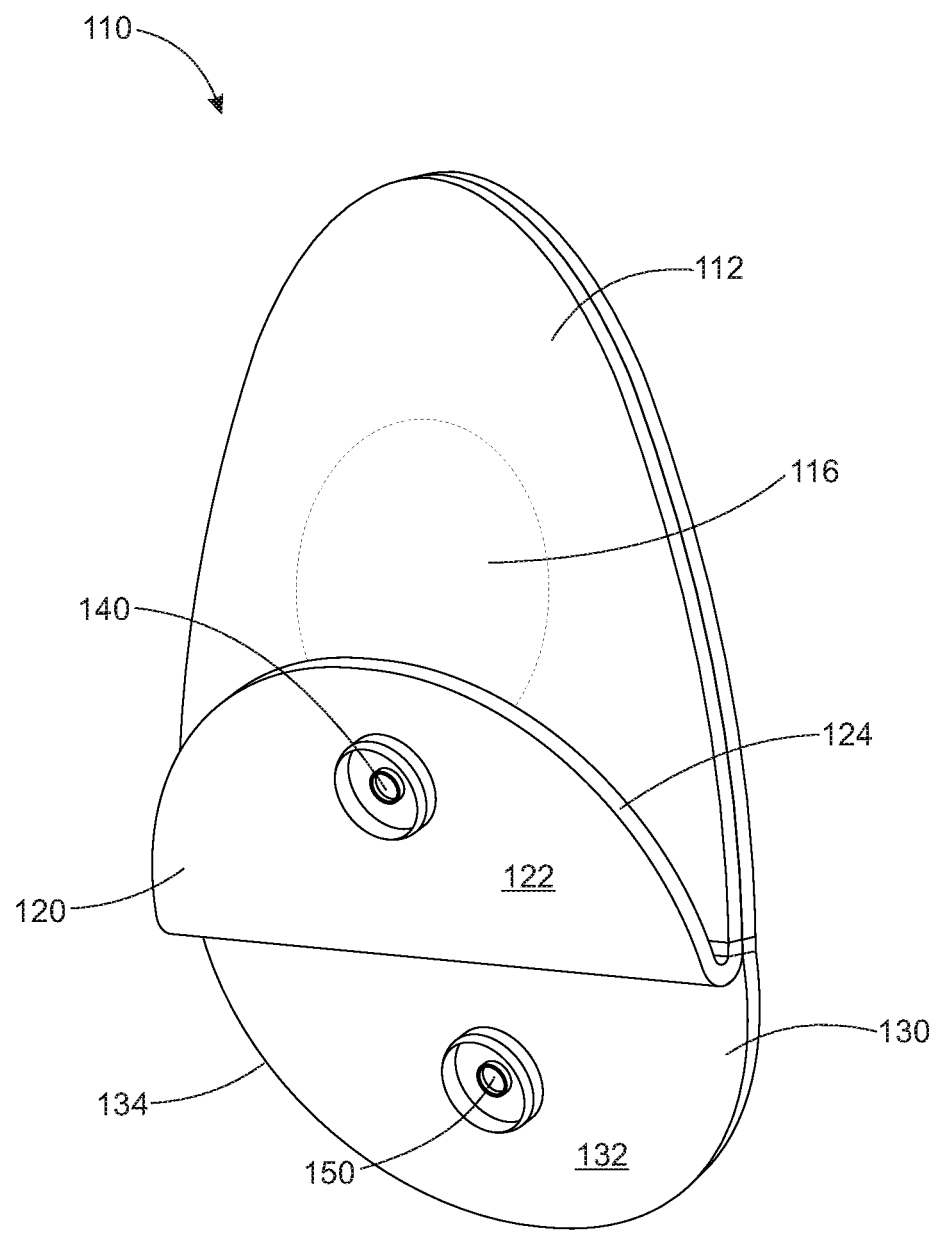
FIG. 5 shows a front perspective view of the universal coupler of FIG. 4 with a front flap flipped up.
Figure 6:
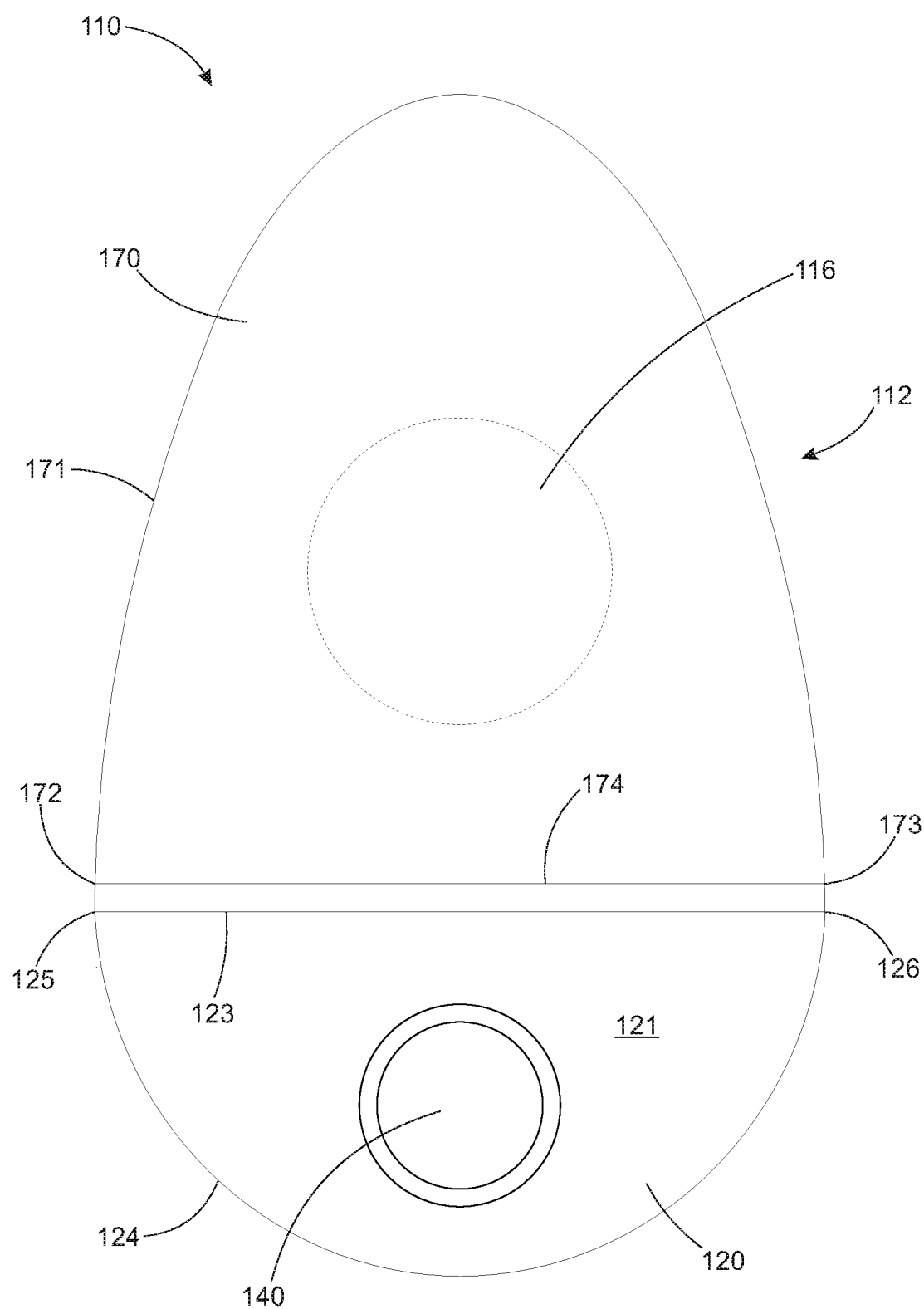
FIG. 6 shows a front view of the universal coupler of FIG. 4.
Figure 7:
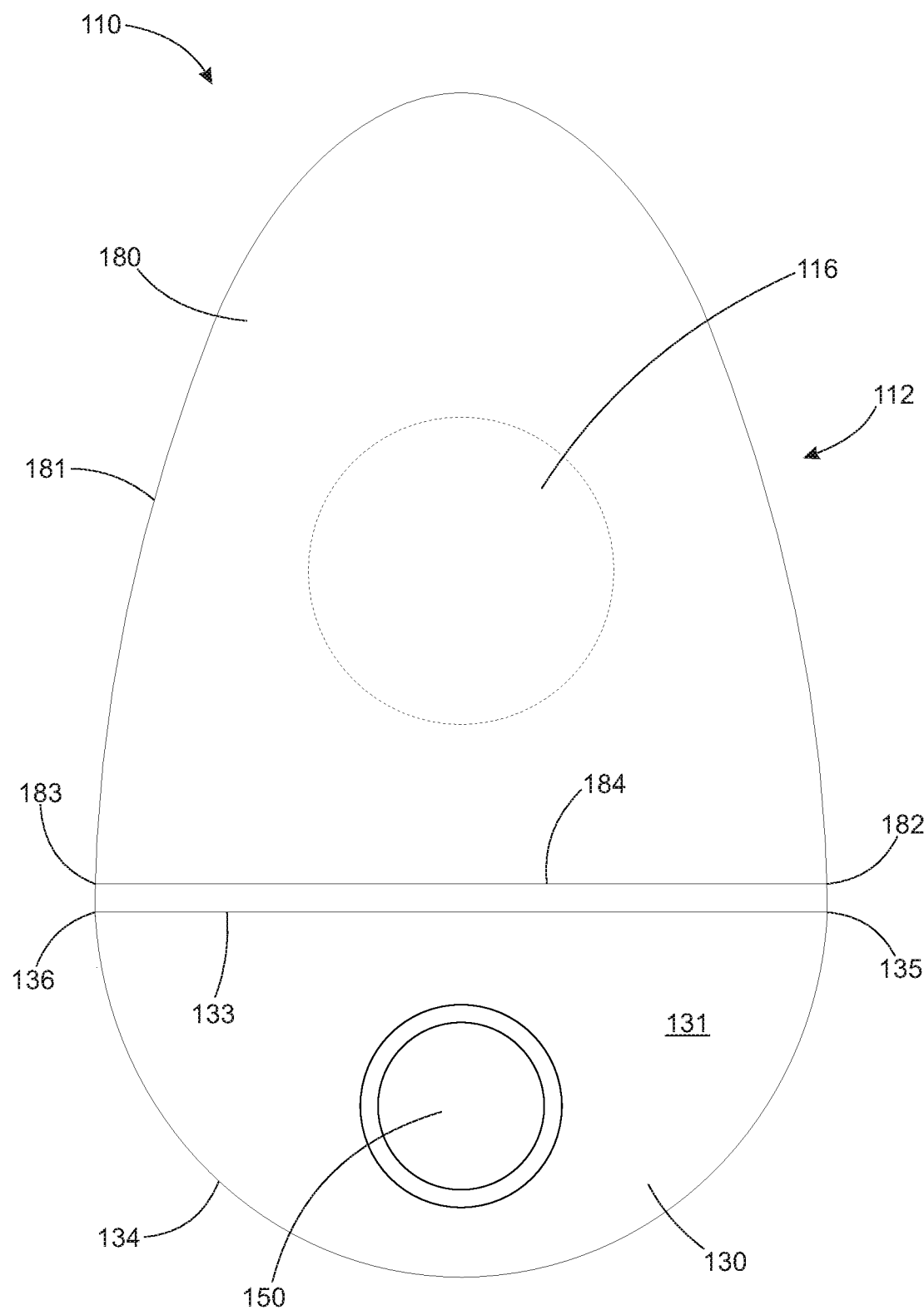
FIG. 7 shows a rear view of the universal coupler of FIG. 4.
Figure 8:
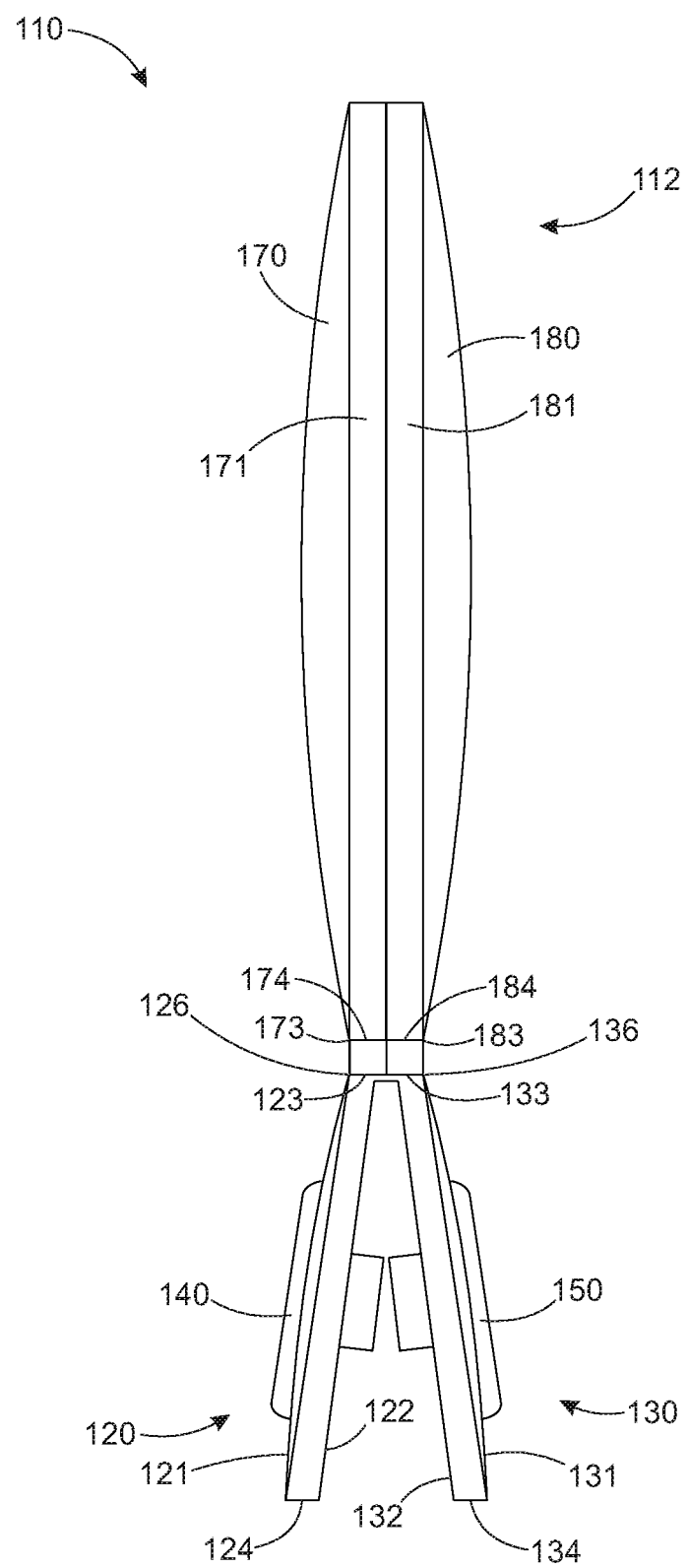
FIG. 8 shows a side view of the universal coupler of FIG. 4.
Figure 9:
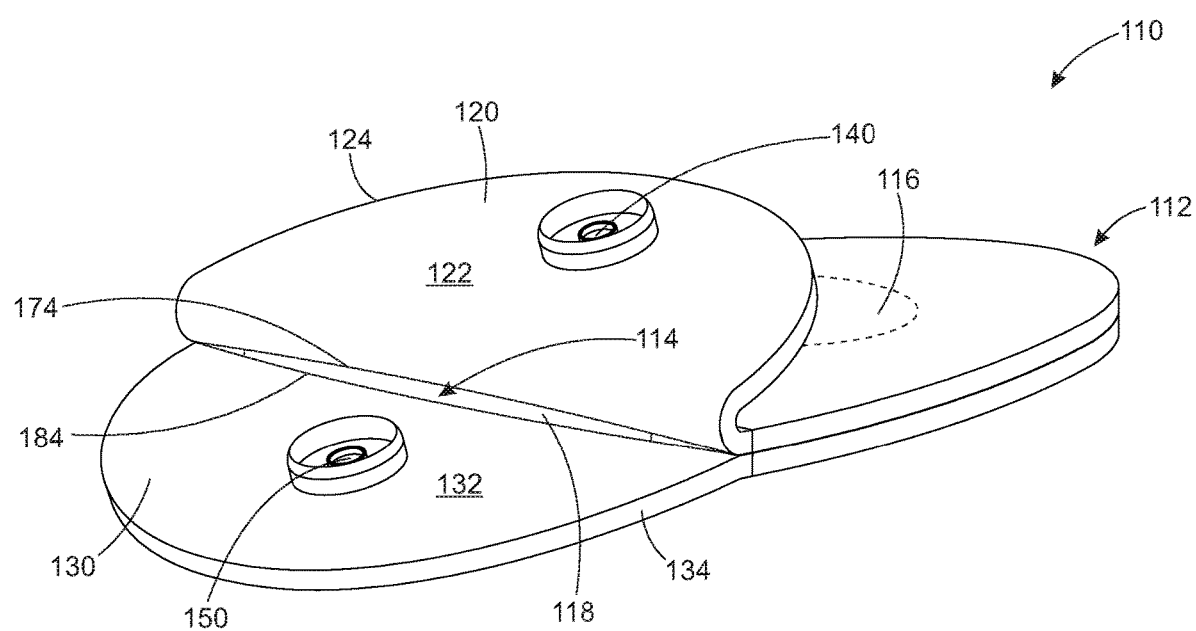
FIG. 9 shows a bottom perspective view of the universal coupler of FIG. 4 showing an opening into a pouch of the universal coupler.

FIG. 4 through FIG. 9 shows details of universal coupler 110. FIG. 4 shows a front perspective view of universal coupler 110. FIG. 5 shows a front perspective view of universal coupler 110 with a first flap 120 flipped up. FIG. 6 shows a front view of universal coupler 110. FIG. 7 shows a rear view of universal coupler 110. FIG. 8 shows a side view of universal coupler 110. FIG. 9 shows a bottom perspective view of universal coupler 110 with front flap 120 flipped up.

Universal coupler 110 includes a pouch 112 that has a cavity 114 inside pouch 112. Cavity 114 is best seen in FIG. 9. At least one magnet 116 is enclosed within cavity 114 of pouch 112. One magnet 116 is within pouch 112 in this embodiment, but this is not meant to be limiting. In some embodiments, magnet 116 is coupled to pouch 116 by gluing, sewing, etc. instead of magnet 116 being within pouch 112. Magnet 116 is used to removably couple universal coupler 110, universal coupling device 164, and towel 166 to any metal surface.

Universal coupler 110 includes a first flap 120 coupled to pouch 112, and a second flap 130 coupled to pouch 112. First and second flap 120 and 130 are each formed of a flexible material. First flap 120 has a first flap coupling element 140 coupled to first flap 120. Second flap 130 has a second flap coupling element 150 coupled to second flap 130. First and second flap coupling elements 140 and 150 are snap elements in this embodiment, but this is not meant to be limiting. First and second flap coupling elements 140 and 150 can be any type of coupling element. First and second flap coupling elements 140 and 150 extend all the way through first and second flap 120 and 130, respectively, in this embodiment.

Universal coupler 110 is formed to have an ovoidal shape in both front and rear views, see FIG. 6 and FIG. 7.

First and second flap coupling elements 140 and 150 are used to removably couple universal coupler 110 to universal coupling device 164, as shown in FIG. 1 through FIG. 3. First flap coupling element 140 is removably coupled to first device coupling element 165 to removably couple universal coupler 110 to universal coupling device 164. First flap coupling element 140 and first device coupling element 165 are each snap elements which snap together to couple first flap coupling element 140 to first device coupling element 165 in this embodiment, but this is not meant to be limiting. In some embodiments, first flap coupling element 140 and first device coupling element 165 are other types of mating couplers, such as hook and loop couplers, buttons, pins, tape, ties, for example, but not by way of limitation.

Second flap coupling element 150 is removably coupled to second device coupling element 169 to removably couple universal coupler 110 to universal coupling device 164, see FIG. 1 through FIG. 3. Second flap coupling element 150 and second device coupling element 169 are each snap elements which snap together to couple second flap coupling element 150 to second device coupling element 169 in this embodiment, but this is not meant to be limiting. In some embodiments, second flap coupling element 150 and second device coupling element 169 are other types of mating couplers.

Pouch 112 is made of a flexible material, in this embodiment, and is made to hold magnet 116 within pouch 112 so that universal coupler 110 can removably couple to a metal surface. Pouch 112 is made of a rubber material in this embodiment, but this is not meant to be limiting. Magnet 116 of universal coupler 110 coupling to a metal surface will couple whatever is coupled to universal coupler 110 to the metal surface. In the embodiment shown in the figures, universal coupling device 164 and towel 166 are coupled to universal coupler 110, and universal coupler 110 removably and repeatably couples universal coupler 164 and towel 166 to a metal surface. Universal coupler 110 can couple towel system 108 to a golf cart, a golf club, a locker, or any other metal surface to keep towel 166 handy to a golfer.

Pouch 112 is formed of a rubber material in this embodiment, but this is not meant to be limiting. Pouch 112 can be formed of any flexible, rigid, or semi-rigid material that can hold magnet 116. For example, pouch 112 can be formed of woven material, plastic or elastic, manmade material or natural materials. Pouch 112 has a cavity 114, best seen in FIG. 9. Magnet 116 is enclosed, contained, or held, within cavity 114 of pouch 112.

Pouch 112 is formed of a pouch front panel 170 and a pouch rear panel 180, see FIG. 6 through FIG. 8. Pouch front panel 170 and pouch rear panel 180 are coupled together to form pouch 112, with cavity 114 between pouch front panel 170 and pouch rear panel 180. Pouch front panel 170 is formed of a flexible material in this embodiment, but this is not meant to be limiting. Pouch front panel 170 has a pouch front panel elliptical edge 171 and a pouch front panel straight edge 174, see FIG. 6 and FIG. 8. Pouch front panel elliptical edge 171 is elliptical arc shaped and extends from a pouch front panel first corner 172 to a pouch front panel second corner 173 along elliptical arc shaped pouch front panel elliptical edge 171. Pouch front panel straight edge 174 is essentially straight and extends between pouch front panel first corner 172 to pouch front panel second corner 173 along straight shaped pouch front panel straight edge 174.

Pouch rear panel 180 is formed of a flexible material in this embodiment, but this is not meant to be limiting. Pouch rear panel 180 is the same size and shape as pouch front panel 170. Pouch rear panel 180 has a pouch rear panel elliptical edge 181 and a pouch rear panel straight edge 184, see FIG. 7 and FIG. 8. Pouch rear panel elliptical edge 181 is elliptical arc shaped and extends from a pouch rear panel first corner 182 to a pouch rear panel second corner 183 along elliptical arc shaped pouch rear panel elliptical edge 181. Pouch rear panel straight edge 184 is essentially straight and extends from pouch rear panel first corner 182 to pouch rear panel second corner 183 along straight shaped pouch rear panel straight edge 184.

Pouch front panel 170 and pouch rear panel 180 are overlaid one on top of the other, and coupled together along their elliptical edges to form pouch 112 with cavity 114 in between. Pouch front panel first corner 172 is adjacent pouch rear panel first corner 182. Pouch front panel second corner 173 is adjacent pouch rear panel second corner 183 (see FIG. 8). Pouch front panel elliptical edge 171 is coupled to pouch rear panel elliptical edge 181 along the length of pouch front panel elliptical edge 171 and pouch rear panel elliptical edge 181. Pouch front panel elliptical edge 171 can be coupled to pouch rear panel elliptical edge 181 using any suitable means such as sewing, gluing, taping, stapling, or forming pouch 112 from one integral unit.

Pouch front panel straight edge 174 extends adjacent pouch rear panel straight edge 184, see FIG. 8 and FIG. 9, but pouch front panel straight edge 174 is not coupled to pouch rear panel straight edge 184. An opening 118 is between pouch front panel straight edge 174 and pouch rear panel straight edge 184, see FIG. 9. Opening 118 is a hole or aperture into cavity 114. Magnet 116 is placed within cavity 114 through opening 118. Opening 118 is biased shut by the flexible material of pouch front panel straight edge 174 and pouch rear panel straight edge 184 so that magnet 116 stays within cavity 114 once it is put in cavity 114.

First flap 120 and second flap 130 are coupled to pouch 112. First flap 120 and second flap 130 are formed of flexible material, in this embodiment, with a semicircular (half-moon) shape in both front and rear views, see FIG. 6 and FIG. 7. Second flap 130 has the same size and shape as first flap 120.

First flap 120 has a first flap outer surface 121, a first flap inner surface 122 (FIG. 5 and FIG. 8), a first flap straight edge 123, and a first flap curved edge 124, see FIG. 5, FIG. 6, FIG. 8, and FIG. 9, for example. First flap straight edge 123 is coupled to pouch front panel straight edge 174 (FIG. 6 and FIG. 8). First flap curved edge 124 is semicircular arc shaped in this embodiment, with a first flap curved edge first end 125 and a first flap curved edge second end 126 opposing first flap curved edge first end 125. First flap curved edge first end 125 is coupled to pouch front panel first corner 172. First flap curved edge second end 126 is coupled to pouch front panel second corner 173, see FIG. 6 and FIG. 8. First flap coupling element 140 is a snap in this embodiment, which extends through first flap outer surface 121 and first flap inner surface 122. First flap coupling element 140 can be many different types of coupling elements, see for example, FIG. 10 through FIG. 14 and the accompanying descriptions.

Second flap 130 has a second flap outer surface 131, a second flap inner surface 132, a second flap straight edge 133, and a second flap curved edge 134, see FIG. 5, FIG. 7, FIG. 8, and FIG. 9, for example. Second flap straight edge 133 is coupled to pouch rear panel straight edge 184. Second flap curved edge 134 is semicircular arc shaped in this embodiment, with a second flap curved edge first end 135 and a second flap curved edge second end 136 opposing second flap curved edge first end 135. Second flap curved edge first end 135 is coupled to pouch rear panel first corner 182. Second flap curved edge second end 136 is coupled to pouch rear panel second corner 183, see FIG. 7 and FIG. 8. Second flap coupling element 150 is a snap in this embodiment, which extends through second flap outer surface 131 and second flap inner surface 132. Second flap coupling element 150 can be many different types of coupling elements, see for example, FIG. 10 through FIG. 14 and the accompanying descriptions.

Magnet 116 is slid through opening 118, see FIG. 9, to place magnet 116 into cavity 114 of pouch 112. The flexible material of pouch 112 holds magnet 116 within pouch 112 once magnet 116 is placed in cavity 114. Once magnet 116 is held within pouch 112, universal coupler 110 can be coupled to a metal surface using magnet 116. With towel 166 coupled to universal coupling device 164, and universal coupling device 164 coupled to universal coupler 110, magnet 116 will couple universal coupler 110, universal coupling device 164, and towel 166, or whatever other device or element is coupled to universal coupler 110, to the metal surface.

Figure 10:
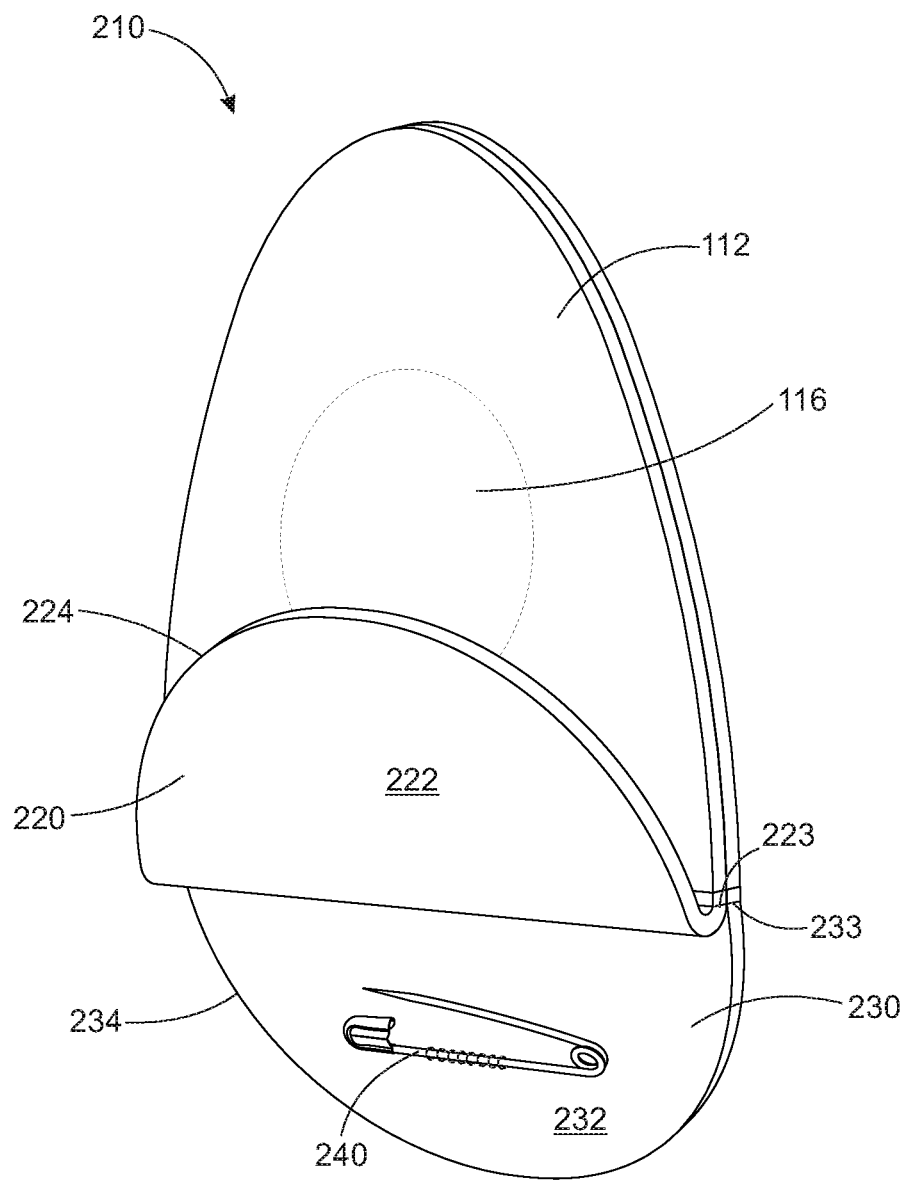
FIG. 10 shows a front perspective view of a further embodiment of a universal coupler.

FIG. 10 shows details of a universal coupler 210. FIG. 10 shows a front perspective view of universal coupler 210 with a first flap 220 flipped up. Universal coupler 210 is the same as universal coupler 110 except that first and second flap coupling elements 140 and 150 are replaced with a single flap coupling element 240, which is a safety pin. Towel 166, or other towels or devices, can be coupled to universal coupler 210 using flap coupling element 240.

Universal coupler 210 includes pouch 112 that has cavity 114 inside pouch 114. At least one magnet 116 is enclosed within cavity 114 of pouch 112, just as with universal coupler 110. One magnet 116 is within pouch 112 in this embodiment, but this is not meant to be limiting. Magnet 116 is used to removably couple universal coupler 210 to any metal surface.

Universal coupler 210 includes first flap 220 coupled to pouch 112, and a second flap 230 coupled to pouch 112. First flap 220 is the same as first flap 120 except first flap 220 has no coupling element coupled to it. Second flap 230 is the same as second flap 130 except second flap coupling element 150 is replaced with flap coupling element 240. Flap coupling element 240 is coupled to second flap 230. Flap coupling element 240 is a safety pin in this embodiment, but this is not meant to be limiting. Flap coupling element 240 can be any type of coupling element. In some embodiments, flap coupling element 240 is coupled to first flap 220.

Universal coupler 210 is formed to have an ovoidal shape in both front and rear views, the same as universal coupler 110.

Flap coupling element 240 is used to removably couple universal coupler 210 to a towel, other sports equipment, or other devices. Pouch 112 is made of a flexible material in this embodiment and is made to hold magnet 116 within pouch 112 so that universal coupler 210 can removably couple to a metal surface. Once flap coupling element 240 is coupled to a towel or other device, universal coupler 210 uses magnet 116 to repeatably and removably couple universal coupler 210 and the device coupled to universal coupler 210 to any metal surface. Universal coupler 210 can couple a towel system or other device to a golf cart, a golf club, a locker, or any other metal surface to keep the towel or device handy to a golfer, athlete, or other user of universal coupler 210.

First flap 220 and second flap 230 are formed of a flexible material, in this embodiment, with a semicircular (half-moon) shape in both front and rear views, see FIG. 10. Second flap 230 is the same size and shape as first flap 220.

First flap 220 has the same detailed description as first flap 120, except without first flap coupling element 140. First flap 220 has a first flap outer surface, a first flap inner surface 222, a first flap straight edge 223 coupled to pouch 112, and a first flap curved edge 224, see FIG. 10.

Second flap 230 has the same detailed description as second flap 130, except with second flap coupling element 150 replaced with flap coupling element 240. Second flap 230 has a second flap outer surface, a second flap inner surface 232 (FIG. 10) a second flap straight edge 233, and a second flap curved edge 234, see FIG. 10. Second flap straight edge 233 is coupled to pouch 112. Second flap curved edge 234 is semicircular arc shaped in this embodiment. Flap coupling element 240 is coupled to second flap inner surface 232, see FIG. 10. Flap coupling element 240 is a safety pin that is used to couple universal coupler 210 to a towel or any other device or element that can couple to flap coupling element 240.

Figure 11:
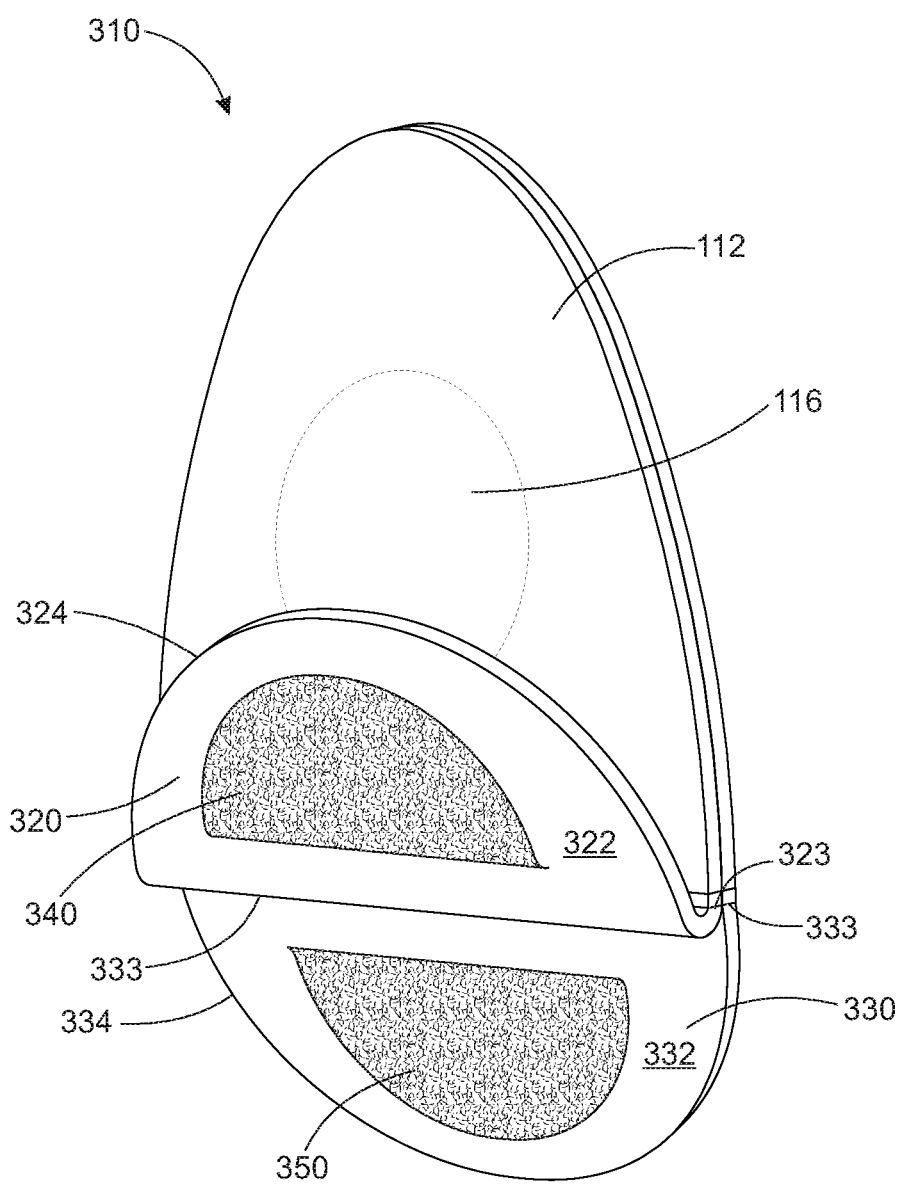
FIG. 11 shows a front perspective view of an additional embodiment of a universal coupler.

FIG. 11 shows details of a universal coupler 310. FIG. 11 shows a front perspective view of universal coupler 310 with a first flap 320 flipped up. Universal coupler 310 is the same as universal coupler 110 except that first and second flap coupling elements 140 and 150 are replaced with first and second flap coupling elements 340 and 350, which are hook and loop elements instead of snaps. Towel 166, or other towels or devices, can be coupled to universal coupler 310 using first and second flap coupling elements 340 and 350. Towel 166, or other devices, can have the mating hook and loop elements, for example, that couple to first and second flap coupling elements 340 and/or 350 to couple towel 166 or the other device to first or second flap coupling elements 340 and 350.

Universal coupler 310 includes pouch 112 that has cavity 114 inside pouch 114, the same as universal coupler 110. At least one magnet 116 is enclosed in cavity 114 of pouch 112, just as with universal coupler 110. One magnet 116 is within pouch 112 in this embodiment, but this is not meant to be limiting. Magnet 116 is used to removably couple universal coupler 310 to any metal surface.

Universal coupler 310 includes a first flap 320 coupled to pouch 112, and a second flap 330 coupled to pouch 112. First flap 320 is the same as first flap 120 except first flap 320 has first flap coupling element 340 coupled to it instead of first flap coupling element 140. Second flap 330 is the same as second flap 130 except second flap coupling element 150 is replaced with second flap coupling element 340. Universal coupler 310 is formed to have an ovoidal shape in both front and rear views, the same as universal coupler 110.

First and second flap coupling elements 340 and 350 are used to removably couple universal coupler 310 to a towel, a towel system, a universal coupling device, other sports equipment, or other devices.

Pouch 112 is made of a flexible material, in this embodiment, and is made to hold magnet 116 within pouch 112 so that universal coupler 310 can removably couple to a metal surface. Once first and second flap coupling elements 340 and 350 are coupled to a towel or other device, universal coupler 310 uses magnet 116 to repeatably and removably couple universal coupler 310 and the device coupled to universal coupler 310 to any metal surface. Universal coupler 310 can couple a towel or other device to a golf cart, a golf club, a locker, or any other metal surface, to keep the towel or device handy to a golfer, swimmer, bowler, other athlete, or other user of universal coupler 310.

First flap 320 and second flap 330 are formed of a flexible material, in this embodiment, with a semicircular (half-moon) shape in both front and rear views, see FIG. 11. Second flap 330 is the same size and shape as first flap 320.

First flap 320 has the same detailed description as first flap 120, with first flap coupling element 140 replaced with first flap coupling element 340. First flap coupling element 340 is coupled to first flap 320. First flap 320 has a first flap outer surface, a first flap inner surface 322, a first flap straight edge 323 coupled to pouch 112, and a first flap curved edge 324, see FIG. 11. First flap curved edge 324 is semicircular arc shaped in this embodiment. First flap coupling element 340 is coupled to first flap inner surface 322, see FIG. 11. First flap coupling element 340 is a hook and loop coupler element that is used to couple universal coupler 310 to a towel or any other device or element that can couple to first flap coupling element 340. In this embodiment, first flap coupler element 340 is the hook portion of a hook and loop coupler element and can couple to any loop portion of a hook and loop coupler.

Second flap 330 has the same detailed description as second flap 130, except with second flap coupling element 150 replaced with second flap coupling element 350. Second flap coupling element 350 is coupled to second flap 330. Second flap 330 has a second flap outer surface, a second flap inner surface 332 (FIG. 11) a second flap straight edge 333, and a second flap curved edge 334, see FIG. 11. Second flap straight edge 333 is coupled to pouch 112. Second flap curved edge 334 is semicircular arc shaped, in this embodiment. Second flap coupling element 350 is coupled to second flap inner surface 332, see FIG. 11. Second flap coupling element 350 is a hook and loop coupler element that is used to couple universal coupler 310 to a towel or any other device or element that can couple to second flap coupling element 350. In this embodiment, second flap coupler element 350 is the hook portion of a hook and loop coupler element and can couple to any loop portion of a hook and loop coupler. It is to be noted that first and second flap coupling elements 340 and 350 are the same type of the hook and loop coupler element, not opposing elements, because they are not meant to couple to each other. First and second flap coupling elements 340 and 350 do not couple to each other, but to the item or device that is to be coupled to universal coupler 310. A towel, for example, can have the opposing loop coupler elements on it to couple the towel system to universal coupler 310. Or, a universal coupling device similar to universal coupling device 164 can have the opposing loop coupler elements coupled to it to couple to first or second flap coupler element 340 or 350. Any item or device that has the opposing loop coupler element on it can couple to first and second flap coupling elements 340 and 350. In some embodiments, only one of first or second flap coupling elements 340 or 350 is used on universal coupler 310.

Figure 12:
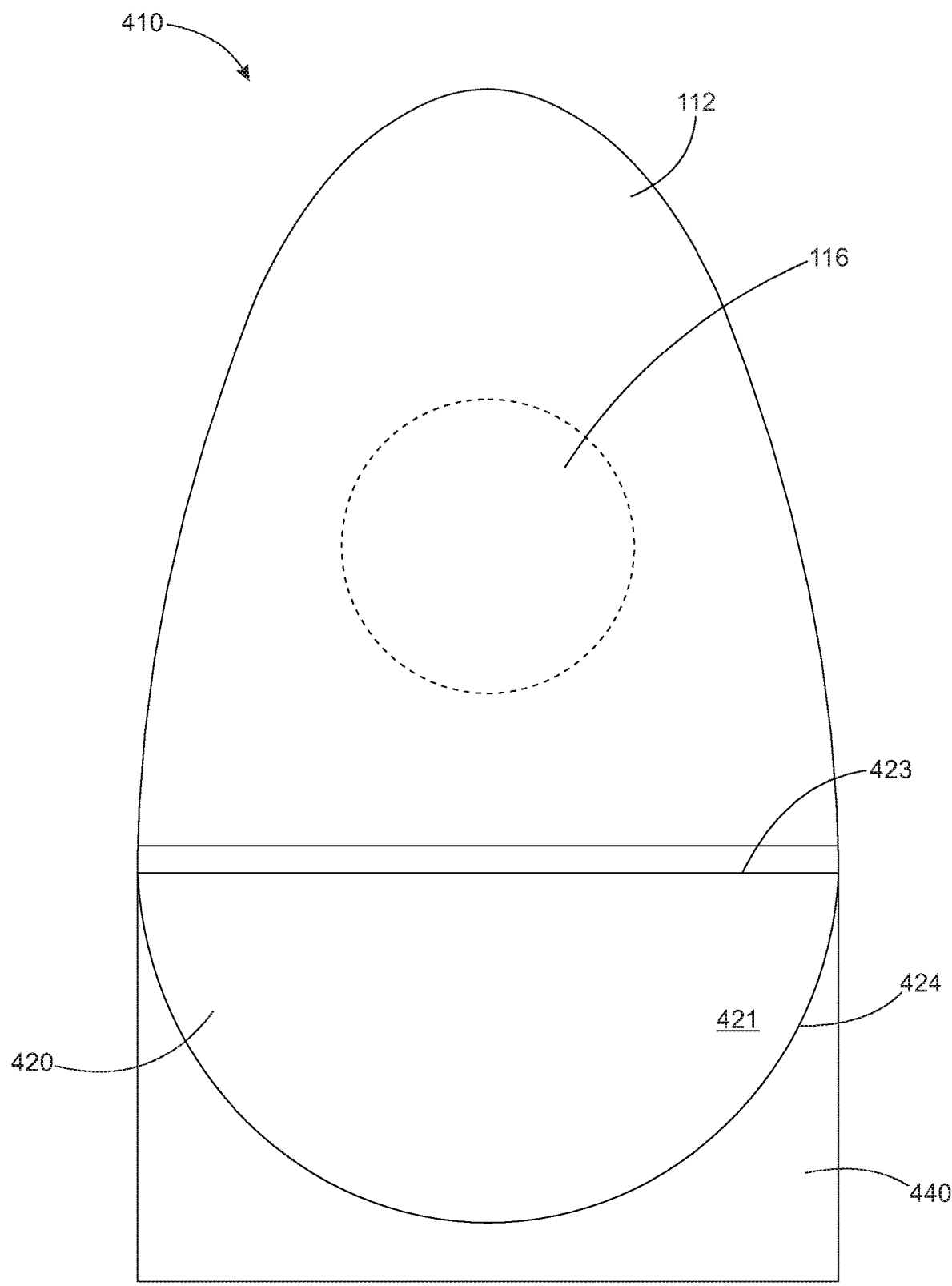
FIG. 12 shows a front view of another embodiment of a universal coupler.
Figure 13:
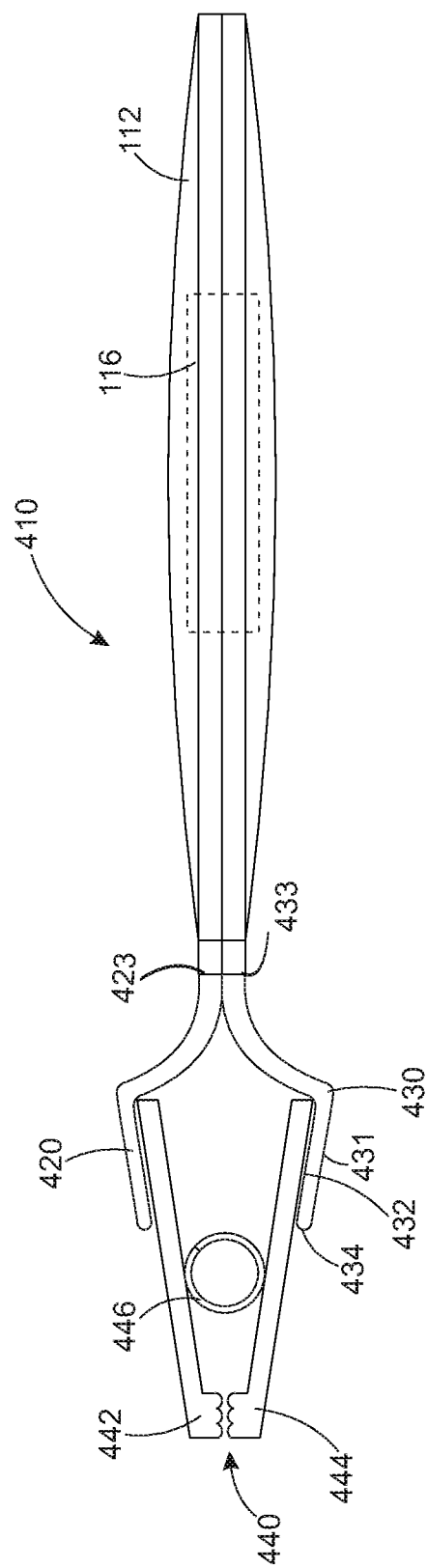
FIG. 13 shows a side view of the universal coupler of FIG. 12.
Figure 14:
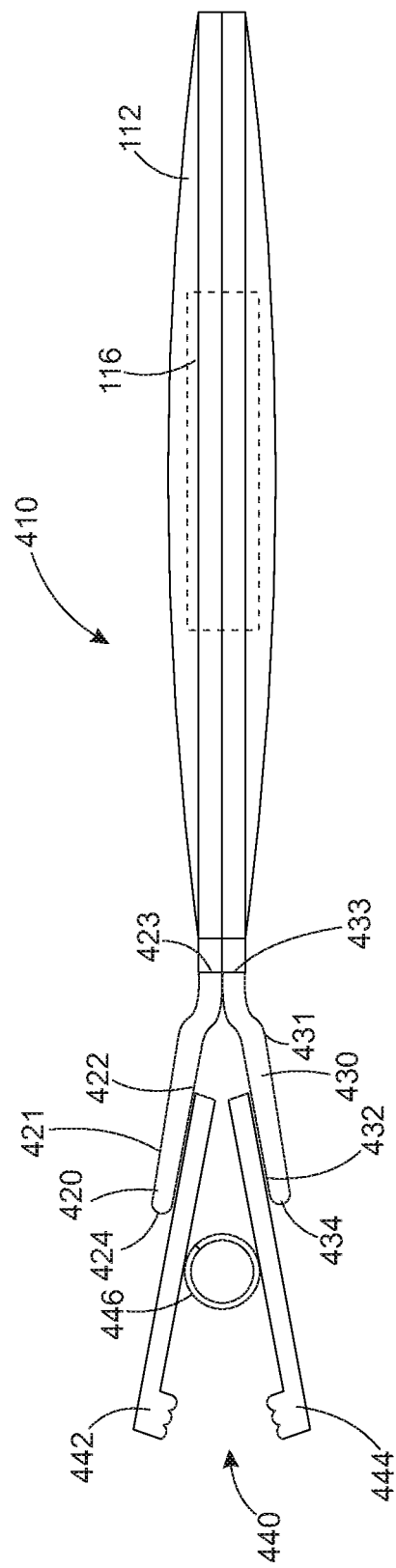
FIG. 14 shows a side view of the universal coupler of FIG. 12 with a set of jaws of a flap coupling element in an open position.

FIG. 12 through FIG. 14 shows details of a universal coupler 410. FIG. 12 shows a front view of universal coupler 410. Universal coupler 410 is the same as universal coupler 110 except that first and second flap coupling elements 140 and 150 are replaced with a flap coupling element 440, which is a spring clip, in this embodiment. FIG. 13 shows a side view of universal coupler 410 with first and second jaws 442 and 444 of flap coupling element 440 in a closed position. FIG. 14 shows a side view of universal coupler 410 with first and second jaws 442 and 444 of flap coupling element 440 in an open position. Towel 166, or other towels or devices, can be coupled to universal coupler 410 using flap coupling element 440.

Universal coupler 410 includes pouch 112 that has cavity 114 inside pouch 114, just as with universal coupler 110. At least one magnet 116 is enclosed in cavity 114 of pouch 112, just as with universal coupler 110. One magnet 116 is within pouch 112 in this embodiment, but this is not meant to be limiting. Magnet 116 is used to removably couple universal coupler 410 to any metal surface.

Universal coupler 410 includes a first flap 420 coupled to pouch 112, and a second flap 430 coupled to pouch 112. First flap 420 is the same as first flap 120 except first flap 420 is coupled to first jaw 442 of flap coupling element 440 instead of having first flap coupling element 140 coupled to first flap 420. Second flap 430 is the same as second flap 130 except second flap 430 is coupled to second jaw 444 of flap coupling element 440 instead of having second flap coupling element 150 coupled to second flap 430. Universal coupler 410 is formed to have an ovoidal shape in both front and rear views, the same as universal coupler 110, see FIG. 12, for example.

Flap coupling element 440 is used to removably couple universal coupler 410 to a towel, a towel system, other sports equipment, or other devices. Flap coupling element 440 is a spring clip in this embodiment. Flap coupling element 440 can clip on to a towel, a universal coupling device, or many other types of sports equipment or devices.

Pouch 112 is made of a flexible material, in this embodiment, and is made to hold magnet 116 within pouch 112 so that universal coupler 410 can removably couple to a metal surface. Once flap coupling element 440 is coupled to a towel or other device, universal coupler 410 uses magnet 116 to repeatably and removably couple universal coupler 410 and the device coupled to universal coupler 410 to any metal surface. Universal coupler 410 can couple a towel system or other device to a golf cart, a golf club, a locker, or any other metal surface to keep the towel or device handy to a golfer, athlete, or other user of universal coupler 410.

First flap 420 and second flap 430 are formed of a flexible material, in this embodiment, with a semicircular (half-moon) shape in both front and rear views, see FIG. 12. Second flap 430 is the same size and shape as first flap 420.

First flap 420 has the same detailed description as first flap 120, except that first flap 420 is coupled to flap coupling element 440 instead of first flap coupling element 140. Specifically, first flap 420 is coupled to first jaw 442 of flap coupling element 440. First flap 420 has a first flap outer surface 421, a first flap inner surface 422, a first flap straight edge 423 coupled to pouch 112, and a first flap curved edge 424, see FIG. 12 through FIG. 14. First flap curved edge 424 is semicircular arc shaped, in this embodiment.

Second flap 430 has the same detailed description as second flap 130, except that second flap 430 is coupled to flap coupling element 440 instead of second flap coupling element 150. Second flap 430 has a second flap outer surface 431, a second flap inner surface 432 (FIG. 13 and FIG. 14)

a second flap straight edge 433, and a second flap curved edge 434, see FIG. 13 and FIG. 14. Second flap straight edge 433 is coupled to pouch 112. Second flap curved edge 434 is semicircular arc shaped, in this embodiment.

Flap coupling element 440 is coupled to both first flap inner surface 422 and second flap inner surface 432, see FIG. 13 and FIG. 14. Flap coupling element 440 is a spring clip, in this embodiment having first jaw 442, second jaw 444, and spring 446, as shown in FIG. 13 and FIG. 14. Spring 446 hingedly couples first jaw 442 to second jaw 444. Spring 446 biases first and second jaws 442 and 444 closed (FIG. 13), but first and second jaws 442 and 444 can be put in an open position, seen in FIG. 14, to allow flap coupling element 440 to clip onto another element, such as a towel system, a towel, or another piece of sports equipment.

First jaw 442 is coupled to first flap inner surface 422 of first flap 420. Second jaw 444 is coupled to second flap inner surface 432 of second flap 430. Any item or device that flap coupling element 440 can couple to, can be held by universal coupler 410, and then universal coupler 410 can be coupled to a metal surface to hold universal coupler 410 and the device held by flap coupling element 440 in a convenient location for an athlete or other user.

Figure 15:
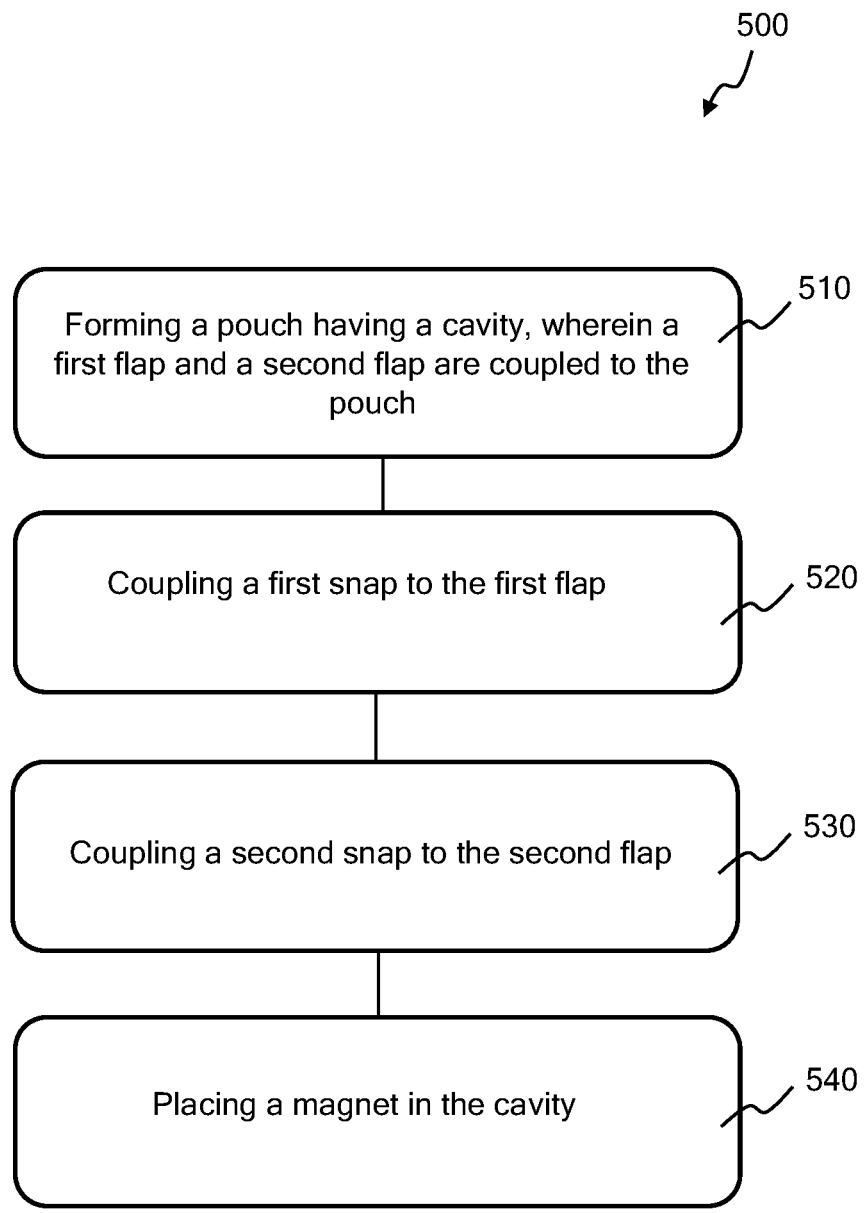
FIG. 15 illustrates a method of assembling a universal coupler.

FIG. 15 illustrates a method 500 of assembling a universal coupler. Method 500 includes an act 510 of forming a pouch having a cavity. A first flap and a second flap are coupled to the pouch.

In some embodiments, the pouch includes a pouch front panel formed of a flexible material and a pouch rear panel formed of a flexible material. The cavity is between the pouch front panel and the pouch rear panel. The pouch front panel includes a pouch front panel elliptical edge and a pouch front panel straight edge. The first flap is coupled to the pouch front panel straight edge. The pouch rear panel includes a pouch rear panel elliptical edge and a pouch rear panel straight edge. The pouch rear panel is the same size and shape as the pouch front panel. The pouch front panel elliptical edge is coupled to the pouch rear panel elliptical edge. The pouch rear panel straight edge is coupled to the second flap. The pouch rear panel straight edge is adjacent (extends alongside) the pouch front panel straight edge. The pouch includes an opening or hole into the cavity between the pouch front panel straight edge and the pouch rear panel straight edge.

Method 500 also includes an act 520 of coupling a first snap to the first flap. In some embodiments, the first snap is replaced with another type of coupler.

Method 500 also includes an act 530 of coupling a second snap to the second flap. In some embodiments, the second snap is replaced with a different type of coupler.

Method 500 includes an act 540 of placing a magnet in the cavity. In some embodiments, the magnet is placed in the cavity through the opening.

Figure 16:
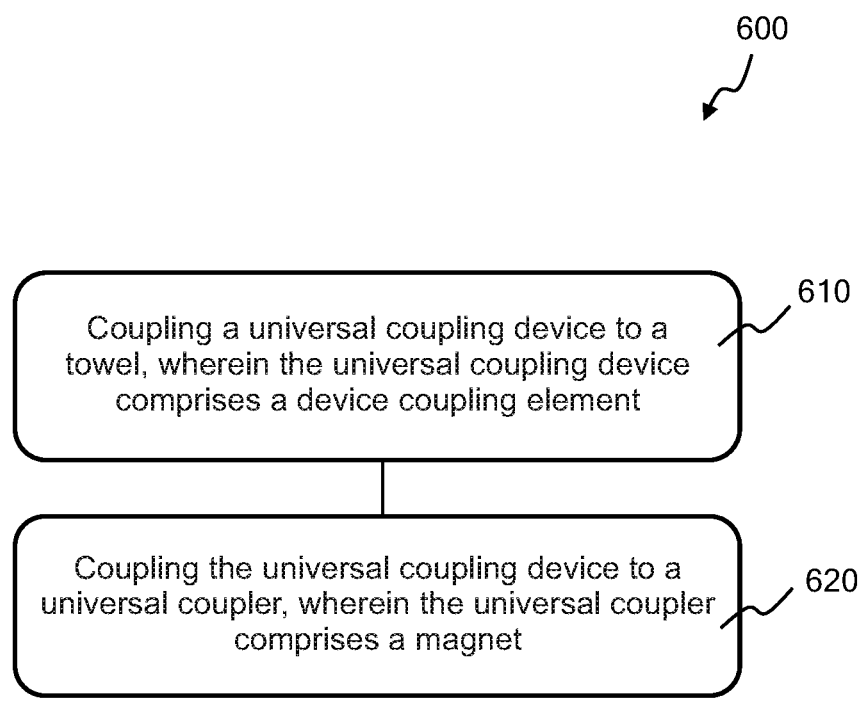
FIG. 16 illustrates a method of assembling a sports towel system.

FIG. 16 illustrates a method 600 of assembling a sports towel system. Method 600 includes an act 610 of coupling a universal coupling device to a towel, where the universal coupling device includes a device coupling element. In some embodiments the device coupling element is a snap. In some embodiments, the device coupling element is a first device coupling element and the universal coupling device further includes a second device coupling element. In some embodiments, the first and the second device coupling elements are both snaps.

In some embodiments, the universal coupling device includes a universal coupling device front panel and a universal coupling device rear panel. In some embodiments, the universal coupling device front panel and the universal coupling device rear panel are both formed of a flexible material and are both semicircular shaped. In some embodiments, the universal coupling device front panel and the universal coupling device rear panel both have the same size and shape.

In some embodiments, the coupling the universal coupling device to the towel includes coupling the universal coupling device front panel to the universal coupling device rear panel with the towel in between the universal coupling device front panel and the universal coupling device rear panel.

Method 600 also includes an act 620 of coupling the universal coupling device to a universal coupler, where the universal coupler includes a magnet. In some embodiments, the universal coupler includes a pouch having a cavity, and at least one magnet in the pouch. In some embodiments, a first and a second flap are coupled to the pouch. In some embodiments, a first flap coupling element is coupled to the first flap. In some embodiments, a second flap coupling element is coupled to the second flap. In some embodiments, the first and/or the second flap coupling elements are snaps.

In some embodiments, either the first or the second flap coupling element couple to the device coupling element. In some embodiments, the coupling the universal coupling device to the universal coupler includes coupling at least one of the first or the second flap coupling elements to the device coupling element.

In some embodiments, the first device coupling element couples to the first flap coupling element, and the second device coupling element couples to the second flap coupling element. In some embodiments, the coupling the universal coupling device to the universal coupler includes coupling the first flap coupling element to the first device coupling element and coupling the second flap coupling element to the second device coupling element.

A sports towel system has been described that includes a universal coupler, a universal coupling device, and a towel. The towel fixedly couples to the universal coupling device, in some embodiments. The universal coupling device is used to removably couple the towel to the universal coupler. The universal coupler includes a magnet and is used to repeatably and removably couple the universal coupler and the towel to a metal surface. The sports towel system can be used by golfers and can be coupled to a golf cart or a golf club, for example. The universal coupler includes a pouch with the cavity inside the pouch. A first and second flap are coupled to the pouch. The first flap has a first flap coupling element and the second flap has a second flap coupling element. The first and/or the second flap coupling elements are used to removably couple the universal coupler to the universal coupling device and to couple the towel to the universal coupler. The pouch has an opening into the cavity between the first and the second flap, through which the magnet is placed into the pouch. The universal coupler uses the magnet to couple the universal coupler to a metal surface. Other devices besides the towel and universal coupling device can be coupled to the universal coupler to removably couple the device to a metal surface.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A universal coupler comprising:
 a pouch having a cavity, comprising:
  a pouch front panel, wherein the pouch front panel is flexible, and wherein the pouch front panel comprises:
   a pouch front panel elliptical edge; and
   a pouch front panel straight edge;
  a pouch rear panel having a size and shape equal to the size and shape of the pouch front panel, wherein the cavity is between the pouch front panel and the pouch rear panel, wherein the pouch rear panel is flexible, and wherein the pouch rear panel comprises:
   a pouch rear panel elliptical edge, wherein the pouch front panel elliptical edge is coupled to the pouch rear panel elliptical edge; and
   a pouch rear panel straight edge, wherein the pouch rear panel straight edge is adjacent the pouch front panel straight edge; and
  an opening into the cavity between the pouch front panel straight edge and the pouch rear panel straight edge;
 at least one magnet enclosed within the cavity;
 a first flap coupled to the pouch;
 a first flap coupling element coupled to the first flap;
 a second flap coupled to the pouch; and
 a second flap coupling element coupled to the second flap.

2. The universal coupler of claim 1, wherein the universal coupler has an ovoidal shape in front view.

3. The universal coupler of claim 1, wherein the first flap is flexible, and wherein the first flap comprises:
 a first flap outer surface;
 a first flap inner surface;
 a first flap straight edge; and
 a first flap curved edge.

4. The universal coupler of claim 3, wherein the first flap straight edge is coupled to the pouch front panel straight edge.

5. The universal coupler of claim 4, wherein the first flap coupling element is a snap element.

6. The universal coupler of claim 3, wherein the second flap is flexible, and wherein the second flap comprises:
 a second flap outer surface;
 a second flap inner surface;
 a second flap straight edge; and
 a second flap curved edge.

7. The universal coupler of claim 6, wherein the second flap straight edge is coupled to the pouch rear panel straight edge.

8. The universal coupler of claim 7, wherein the second flap coupling element is a snap element.

9. A sports towel system comprising:
 a towel;
 a universal coupling device coupled to the towel; and
 a universal coupler removably coupled to the universal coupling device, wherein the universal coupler comprises:
  a pouch having a cavity;
  at least one magnet enclosed within the cavity;
  a first flap coupled to the pouch;
  a first flap coupling element coupled to the first flap;
  a second flap coupled to the pouch; and
  a second flap coupling element coupled to the second flap;
 a universal coupling device front panel, wherein the universal coupling device front panel is flexible and semicircular shaped;
 a universal coupling device rear panel, wherein the universal coupling device rear panel is flexible and semicircular shaped;
 a first device coupling element coupled to the universal coupling device front panel; and
 a second device coupling element coupled to the universal coupling device rear panel;
wherein the universal coupling device front panel is coupled to the universal coupling device rear panel with the towel in between, wherein the towel is coupled to the universal coupling device in response to the universal coupling device front panel being coupled to the universal coupling device rear panel with the towel in between.

10. The sports towel system of claim 9, wherein the first flap coupling element is removably coupled to the first device coupling element to removably couple the universal coupler to the universal coupling device.

11. The sports towel system of claim 10, wherein the second flap coupling element is removably coupled to the second device coupling element to removably couple the universal coupler to the universal coupling device.

12. The sports towel system of claim 9, wherein the pouch comprises:
 a pouch front panel, wherein the pouch front panel is flexible, and wherein the front pouch panel comprises:
  a pouch front panel elliptical edge; and
  a pouch front panel straight edge;
 a pouch rear panel having a size and shape equal to the size and shape of the pouch front panel, wherein the cavity is between the pouch front panel and the pouch rear panel, wherein the pouch rear panel is flexible, and wherein the pouch rear panel comprises:
  a pouch rear panel elliptical edge, wherein the pouch front panel elliptical edge is coupled to the pouch rear panel elliptical edge; and
  a pouch rear panel straight edge, wherein the pouch rear panel straight edge is adjacent the pouch front panel straight edge; and
 an opening into the cavity between the pouch front panel straight edge and the pouch rear panel straight edge.

13. The sports towel system of claim 12, wherein the first flap is flexible, and wherein the first flap comprises:
 a first flap outer surface;
 a first flap inner surface;
 a first flap straight edge, wherein the first flap straight edge is coupled to the pouch front panel straight edge; and
 a first flap curved edge.

14. The sports towel system of claim 13, wherein the second flap is flexible, and wherein the second flap comprises:
 a second flap outer surface;
 a second flap inner surface;
 a second flap straight edge, wherein the second flap straight edge is coupled to the pouch rear panel straight edge; and
 a second flap curved edge.

15. A method of assembling a sports towel system, the method comprising:
 coupling a universal coupling device to a towel, wherein the universal coupling device comprises a device coupling element;

coupling the universal coupling device to a universal coupler, wherein the universal coupler comprises:
- a pouch having a cavity;
- at least one magnet enclosed within the cavity;
- a first flap coupled to the pouch;
- a first flap coupling element coupled to the first flap;
- a second flap coupled to the pouch; and
- a second flap coupling element coupled to the second flap;

wherein coupling the universal coupling device to the universal coupler comprises coupling at least one of the first and the second flap coupling elements to the device coupling element.

16. The method of claim 15, wherein the device coupling element is a first device coupling element, wherein the universal coupling device further comprises a second device coupling element, and wherein the coupling the universal coupling device to the universal coupler comprises coupling the first flap coupling element to the first device coupling element and coupling the second flap coupling element to the second device coupling element.

17. The method of claim 16, wherein the universal coupling device comprises:
- a universal coupling device front panel, wherein the universal coupling device front panel is semicircular shaped;
- a universal coupling device rear panel, wherein the universal coupling device rear panel is semicircular shaped;

wherein the coupling the universal coupling device to the towel comprises coupling the universal coupling device front panel to the universal coupling device rear panel with the towel in between.

* * * * *